Oct. 18, 1955 P. P. HOPF ET AL 2,721,153

PRODUCTION OF CONDUCTING LAYERS UPON ELECTRICAL RESISTORS

Filed May 29, 1950

Inventors
P. P. Hopf
R. E. J. Lishmund
By
Wenderoth, Lind & Ponack
Attorneys

United States Patent Office 2,721,153

Patented Oct. 18, 1955

2,721,153

PRODUCTION OF CONDUCTING LAYERS UPON ELECTRICAL RESISTORS

Peter Paul Hopf, London, and Ronald Edgar John Lishmund, Reigate, England, assignors to Ward Blenkinsop & Company, Limited, London, England, a British company Application May 29, 1950, Serial No. 164,926

Claims priority, application Great Britain June 2, 1949

14 Claims. (Cl. 117—212)

Figure 1:
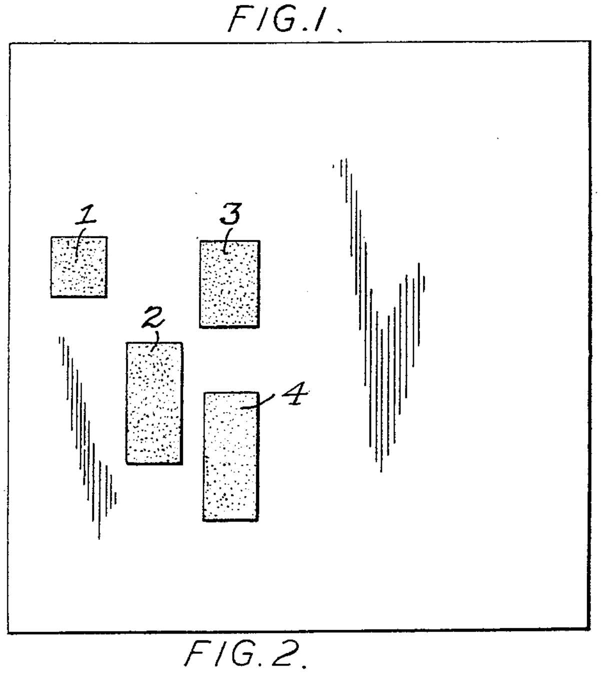

This invention relates to the production of printed electrical components and printed circuits.

During the past few years an increasing demand for printed circuits has arisen as their potentialities have been more fully appreciated and the methods of producing them have improved.

Several methods for producing printed circuits have been described. One is by painting the circuit on to the base material using a suitably pigmented paint: the painting may be done through a stencil. A variant thereof is to spray molten metal. Deposition of metal through a stencil as a result of simultaneously spraying separately prepared solutions of suitably reacting chemicals has also been used. Metal spattering through stencils has been proposed.

In yet another type of process a foil of metal is bonded on to the base material and after applying a resist to those parts of the metal surface in which a conductor is required the remaining metal is etched away and the resist then removed. The usual bonding material employed is a thermo-setting adhesive. A variant of this is a transfer process using a paper coated with pigment and resin, involving a hot stamping operation.

In operating any process of this character it is important to obtain a uniform product with a minimum of rejects and in most of the known processes it has been found that there are various difficulties which lead to lack of uniformity and consequently the protection of rejects is fairly high.

We have now found a process for printing electrical components and printed circuits upon organic electrical insulating materials in which a high degree of uniformity in the product is obtainable, which is simple to control and in which unused conductor can be recovered for re-use. In addition overprinting can be readily carried out by this process.

According to the present invention there is provided a process for producing a printed electrical element which comprises applying to the surface of an organic electrically insulating material a coating substantially free from any permanent binder, of an at least low electrical conducting material in finely divided form, contacting the coated material with a relief printing plate whilst simultaneously applying heat and pressure, the temperature pressure and time employed being such as to cause the individual particles of conducting material in the contact areas to cohere and to become at least partially embedded in the underlying insulating material without substantially changing the electrical properties of the surface thereof and thereafter removing the coating of conducting material from those areas which have not been in contact with the printing plate.

The starting materials employed in the present process are a finely divided form of the conductor such as finely divided silver or carbon. This is made up into a slurry in a volatile diluent to which may be added a small proportion of a less volatile organic solvent which may act as a temporary adhering agent. Examples of suitable diluents are the lower alkanols, especially methanol and ethanol, the cyclic ethers such as dioxane, the lower aliphatic ketones, such as acetone and methyl ethyl ketone, and water. In selecting the diluent regard must be had for any undesirable action, such as a swelling action, which it might have upon the surface of the insulating material. Typical examples of conductors useful in the process are finely divided silver obtained by filtering and washing the composition prepared according to the copending application Serial No. 777,116, filed September 30, 1947, and now Patent 2,592,870, finely divided copper, carbon black and colloidal graphite. Examples of less volatile organic solvents which may be present in the slurries are the lower polyhydric alcohols, such as ethylene glycol and glycerine and the amino-alcohols, such as mono-ethanolamine. The proportion by weight of solids in the slurry varies greatly depending upon the material. In the case of finely divided silver the proportion may be about 4 to 1 whilst with carbon black 1 to 1 is suitable.

The organic electrically insulating material may be a thermoplastic or thermoset material or it may be a high polymer. It may be loaded with inorganic insulating materials such as asbestos, silica or glass fibres. Examples of suitable materials are electrical grades of phenol-formaldehyde and aniline-formaldehyde synthetic resins, amino-plast resins such as urea-formaldehyde and melamine-formaldehyde resins, polyacrylic resins, such as polymethyl methacrylate, polyvinyl resins, such as polystyrene and polythene. There may also be used mixtures of thermoplastic and thermoset resins such as the so-called styrene copolymers and the products obtained by the use of such mixtures as phenol-formaldehyde condensation products with a minor proportion of polyvinyl chloride. These materials may be used in a variety of forms such as sheet laminates, circular or elliptical laminates, arc-shaped laminates, extruded forms, films and filled plates and blocks.

In describing one form of the invention it will be assumed that it is desired to produce a printed circuit in silver upon a phenol-formaldehyde sheet material. The sheet material, which may first have had any holes that are desired bored in it, is substantially uniformly coated with finely divided silver. For this purpose a slurry of sponge silver in methanol may be sprayed on to the surface of the phenol-formaldehyde sheet. The greater part of the methanol is then removed by drying; a small amount is retained for temporarily adhering the silver to the sheet. The sheet is then placed in a press and the coated surface is brought into contact with a heated relief printing plate. This plate may be the usual type of relief copper printing plate. It is preferred to apply the maximum possible pressure and to use the lowest permissible temperature for this operation, which is of short duration—generally of the order of 1–10 seconds. With a phenol-formaldehyde insulating material a pressure of about 1000 lbs./in.$^2$ at about 200° C. and a contact time of 4 seconds has been found suitable.

When materials having a fairly well defined melting point are printed the printing plate may be applied at a temperature somewhat above the melting point for a short interval of time. Thus polythene can be printed using a plate maintained at a temperature some 20° C. above its melting point provided that the time of contact is sufficiently short e. g. 1 second. With thermoset materials quite high temperatures such as 200–250° C. and high pressures such as 1000–2000 lbs./in.$^2$ are preferred. Materials which soften on heating may be printed using a plate maintained at a much higher temperature than that at which they first soften. To some extent the time of contact appears to depend upon the area being printed.

A continuous roll of material which has previously been coated with conductive material on one side may be printed by passing between two rollers one of which is heated and carries a relief print upon its surface and is in contact with the coated side of the material. If desired the other side of the material can be printed in a similar manner in a subsequent step. This method is very suitable when short times of contact are desired. Any desired pressure can be applied at the nip of the rollers.

Where the silver or other conductor has not been in contact with the relief print, the conductor is, after the printing treatment, very loosely held and it can usually be brushed off or blown off by compressed air. In this way it is usually possible to recover the unused material, especially in the case of a material like silver, which is relatively expensive.

When a printed circuit has been produced in the manner described above the spaces that have been left for resistors can be overprinted. To do this the whole of the surface of the once printed plate may be coated with a poor conductor such as graphite in the same way as already described for silver and it is then again printed using a second relief printing plate which is provided with relief portions corresponding only to the resistors required but allowing a slight overlap on to the conductors at the appropriate points in order to provide contacts. The unused graphite can then be brushed off. Alternatively, the resistors can be printed first and the metallic circuit printed thereafter.

Not only complete circuits but specific components such as coils can be printed in the manner described.

An important feature of the process is that the conductor is applied to the surface of the insulating material without a permanent binder being present. A small amount of higher boiling organic liquid or the residue of the volatile diluent is relied upon to maintain a sufficient adherence of the particles of conductor to the insulating material and this is volatilised in at least those areas to which the relief printing plate is applied. In the product the particles firmly cohere to each other and at least the lower portions thereof are firmly embedded in the insulating material in the printed areas.

The higher boiling organic liquid may be so chosen as to counteract any tendency of the conductor to undergo chemical change in the earlier stages of the process. Thus when sponge silver is used a small addition of an ethanolamine may be made to prevent oxidation to silver oxide or to reverse such change, if it has occurred, during the hot pressing. However since the reduction involved is an exothermic process it is not possible to use silver oxide per se in the coating step.

The following examples illustrate the manner in which the invention may be carried into effect:

*Example 1*

A polythene sheet, having a melting point of about 115° C., of 0.031 inch thickness was employed. It was sprayed with a slurry of sponge silver in methanol containing 2% of glycerine. The slurry contained 80 parts of silver for each 20 parts of diluent by weight. Air drying was employed to evaporate the greater part of the diluent. The substantially dried sheet was transferred to a press and brought into contact with a copper relief printing plate maintained at approximately 135° C., the pressure employed was 50 lbs./in.$^2$, the time of contact was somewhat less than one second, the sheet was removed from the press and the unpressed silver blown off.

If the press is run at 120° C. a time of contact of 2–3 seconds is required. The surface of the sheet may be subsequently polished if desired.

*Example 2*

A sheet of polymethyl methacrylate, 0.25 inch thick and having an initial softening point of 80° C. was employed. It was sprayed with carbon black of low oil absorption suspended in ethyl alcohol containing 2% glycerine. The carbon black and solvent were employed in equal proportions by weight. The coated surface was substantially dried using infra-red heat and then placed in a press run at 145°–160° C., the pressure employed was 500 lbs./in.$^2$, times of contact of from 3 to 6 seconds were used, the shorter times being used at the higher temperatures. Carbon black was removed from the unpressed areas by brushing in water.

*Example 3*

A polystyrene film, 0.0005 inch thick was sprayed with sponge silver having an average particle size of 50 $\mu$ as described in Example 1. It was passed between a pair of rollers adjusted to a pressure of 20 lbs./in.$^2$ at the nip. Temperatures between 125 and 140° C. were employed and the rate of passage was 4 feet per minute. After passing through the rollers silver was removed from the unpressed areas by washing in a trough.

*Example 4*

An electrical grade phenol-formaldehyde laminate 0.125 inch thick was employed. It was sprayed with a sponge silver using methanol containing 5% of ethanolamine by weight the slurry containing 80 parts of silver for each 20 parts of diluent by weight. The sprayed surface was substantially dried using infra-red heat and it was then transferred to a press which was run at 200° C. and a pressure of 1000 lbs./in.$^2$. The time of contact was 4 seconds. Unpressed silver was removed from the press plate by brushing.

*Example 5*

The procedure of Example 4 was repeated using, in place of sponge silver, electrolytic copper powder 400 mesh.

*Example 6*

This example illustrates the printing of resistors on to a base already containing a printed circuit produced as in Example 4.

A slurry of colloidal graphite in water was evenly applied to the whole surface of the plate which had already been printed with the silver parts of the circuit and it was dried using infra-red heat at 140° C. The coated plate was transferred to a press run at 175° C. and 1200 lbs./in.$^2$ and was in contact with a relief printing plate for ten seconds. This plate had been made so as to provide the resistances required in a printed circuit produced as described in Example 4 and allowed slight overlap on to the conductors at appropriate points to ensure contact. After removal from the press the plate was washed well and brushed in water.

*Example 7*

An electrical grade of filled aniline-formaldehyde sheet material was employed and it was prepared as described in Example 4. It was placed in the press and pressed for 4 seconds at 185° C. using 700 lbs./in.$^2$ pressures. Resistances were printed on to this plate in exactly the same manner as described in Example 6.

*Example 8*

This example illustrates the printing of a conducting circuit on to a base already containing resistors and is illustrated by the accompanying drawings.

An electrical grade of phenol-formaldehyde laminate 15, 0.125 inch thick was employed. A slurry of colloidal graphite in water was evenly applied to the whole surface and it was dried using infra-red heat at 140° C. The coated plate was transferred to a press run at 175° C. and 1200 lbs./in.$^2$ and was in contact with the relief printing plate for 10 seconds. After removal from the press the plate was washed well and brushed in water. The printed resistances 1, 2, 3, 4 are shown in Fig. 1 of the drawings.

The plate was then printed with a silver circuit in the manner outlined in Example 4, slight overlap on to the resistors being allowed at the appropriate points in order to ensure contact. After printing and removing excess silver the product has the appearance shown in Fig. 2 of the drawings. Numeral 5 indicates points for soldering tags. Numeral 6 shows connection points for a sub-miniature valve holder; numerals 7 indicate soldering points for components from the reverse side of the base, 8 is a seven-turn air wound coil, numerals 9 denote connection points for sub-miniature valve holders astride the chassis, numerals 10 indicate points for direct soldering connections, numeral 11 indicates a connection to the reverse side of the base by eyelet. Numerals 12 indicate contacts for plug in connection to spring contacts while 13 is the soldering point for a foil connection to a capacitor which has a printed base connection 14.

Figure 2:
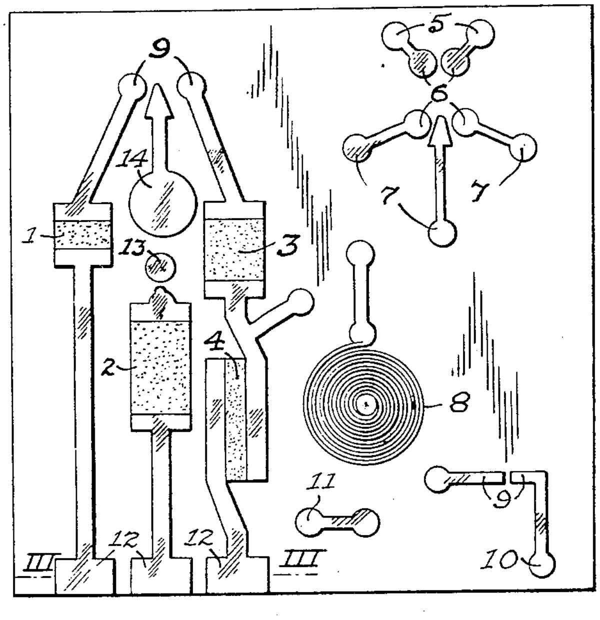
Figure 3:
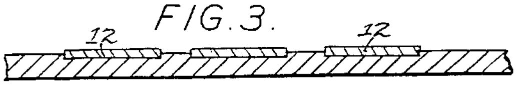

Fig. 3 of the drawings shows a cross-section taken along the line 111—111 of Fig. 2 and shows that the contacts 12 are partially embedded in the base material.

What we claim is:

1. A process for imprinting a circuit element upon a substantially smooth surface of electrical insulating synthetic plastic material which comprises applying to the surface thereof, a slurry of finely divided circuit element forming particles in a volatile liquid that is inert to the plastic, applying simultaneously to at least one selected area of said slurry covered plastic and prior to completion of evaporation of said volatile liquid therefrom, mechanical pressure and heat to cause the individual particles to cohere and to become at least partially embedded in the underlying insulating material without substantially impairing the electrical properties of the surface of the selected area of said material and thereafter removing electrical conductor from those areas of said covered plastic to which said pressure and heat have not been applied.

2. The process as set forth in claim 1 in which the circuit element forming particles are of silver.

3. The process as set forth in claim 1 in which the circuit element forming particles are of carbon black.

4. The process as set forth in claim 1 in which the volatile liquid is selected from the group consisting of water, the lower alkanols, the lower cyclic ethers, the lower aliphatic ketones, their derivatives and mixtures thereof.

5. The process as set forth in claim 4 in which the volatile liquid includes a component of lower volatility to retain the solid particles in place on the plastic material prior to application thereto of the bonding pressure and heat.

6. The process as set forth in claim 5 in which said component of lower volatility is selected from the group consisting of lower polyhydric alcohols and amino-alcohols.

7. The process as set forth in claim 1 in which two sets of circuit forming components are successively applied to the plastic, one set being highly conductive components composed of metal particles, the other set being resistor elements composed of carbon black particles, and in which continuity of circuit between conductive and resistor elements is maintained by end overlapping the areas to which mechanical pressure and heat are applied.

8. A process for imprinting a circuit element upon a substantially smooth surface of electrical insulating synthetic plastic material which comprises applying to the surface thereof a slurry of finely divided circuit element forming particles in a volatile liquid that is inert to the plastic, applying simultaneously to at least one selected area of the slurry covered plastic and prior to completion of evaporation of said volatile liquid therefrom, mechanical pressure of the order of 20 to 2000 lbs. per square inch and heat of the order of 120 to 250° C. for a period of time of up to 10 seconds with resultant complete evaporation of volatile liquid from said selected area, secure embedding of the circuit element forming particles in the surface of the selected area of said plastic material and coherence of such particles without substantially impairing the electrical properties of the surface of said material, and thereafter removing electrical conductor from those areas of said covered plastic to which said mechanical pressure and heat have not been applied.

9. The process as set forth in claim 8 in which the circuit element forming particles are of silver.

10. The process as set forth in claim 8 in which the circuit element forming particles are of carbon black.

11. The process as set forth in claim 8 in which the volatile liquid is selected from the group consisting of water, the lower alkanols, the lower cyclic ethers, the lower aliphatic ketones, their derivatives and mixtures thereof.

12. The process as set forth in claim 11 in which the volatile liquid includes a component of lower volatility to retain the solid particles in place on the plastic material prior to application thereto of the bonding pressure and heat.

13. The process as set forth in claim 12 in which said component of lower volatility is selected from the group consisting of lower polyhydric alcohols and amino-alcohols.

14. The process as set forth in claim 8 in which two sets of circuit forming components are successively applied to the plastic, one set being highly conductive components composed of metal particles, the other set being resistor elements composed of carbon black particles, and in which continuity of circuit between conductive and resistor elements is maintained by end overlapping the areas to which mechanical pressure and heat are applied.

References Cited in the file of this patent

UNITED STATES PATENTS

| | | |
|---|---|---|
| 1,717,193 | Dantsizen | June 11, 1929 |
| 1,922,254 | McCulloch | Aug. 15, 1933 |
| 1,987,969 | Parkin | Jan. 15, 1935 |
| 2,121,005 | Bener | June 21, 1938 |
| 2,136,370 | Bockius et al. | Nov. 15, 1938 |
| 2,177,484 | Fruth | Oct. 24, 1939 |
| 2,191,556 | Carothers | Feb. 27, 1940 |
| 2,429,089 | Box | Oct. 14, 1947 |
| 2,441,960 | Eisler | May 25, 1948 |
| 2,473,183 | Watson | June 14, 1949 |
| 2,474,988 | Sargrove | July 5, 1949 |
| 2,492,429 | John | Dec. 27, 1949 |

FOREIGN PATENTS

| | | |
|---|---|---|
| 269,729 | Great Britain | Apr. 28, 1927 |

OTHER REFERENCES

Printed Circuit, National Bureau of Standards, Circular 468, November 15, 1947, pp. 4, 6, 7, 12, 13, 14, 28.